(12) United States Patent
Andersen

(10) Patent No.: US 10,465,095 B2
(45) Date of Patent: Nov. 5, 2019

(54) CAULKS

(71) Applicant: Papiruld Danmark A/S, Hillerød (DK)

(72) Inventor: Curt Andersen, Rødovre (DK)

(73) Assignee: PAPIRULD DANMARK A/S, Hillerod (DK)

(*) Notice: Subject to any disclaimer, the term of this patent is extended or adjusted under 35 U.S.C. 154(b) by 22 days.

(21) Appl. No.: 15/537,775

(22) PCT Filed: Dec. 23, 2015

(86) PCT No.: PCT/DK2015/050415
§ 371 (c)(1),
(2) Date: Jun. 19, 2017

(87) PCT Pub. No.: WO2016/101962
PCT Pub. Date: Jun. 30, 2016

(65) Prior Publication Data
US 2018/0273800 A1    Sep. 27, 2018

(30) Foreign Application Priority Data

Dec. 23, 2014    (DK) .................... 2014 00749

(51) Int. Cl.
| | | |
|---|---|---|
| C09D 197/00 | (2006.01) | |
| C08L 97/02 | (2006.01) | |
| C09D 5/34 | (2006.01) | |
| C08K 3/34 | (2006.01) | |
| C09J 131/04 | (2006.01) | |
| C08L 97/00 | (2006.01) | |
| C09D 5/14 | (2006.01) | |
| C09D 197/02 | (2006.01) | |
| C09K 3/10 | (2006.01) | |
| C09D 103/02 | (2006.01) | |

(52) U.S. Cl.
CPC ............ *C09D 197/007* (2013.01); *C08K 3/34* (2013.01); *C08L 97/007* (2013.01); *C08L 97/02* (2013.01); *C09D 5/14* (2013.01); *C09D 5/34* (2013.01); *C09D 197/02* (2013.01); *C09J 131/04* (2013.01); *C09K 3/1015* (2013.01); *C09K 3/1025* (2013.01); *C08L 2201/02* (2013.01); *C08L 2205/02* (2013.01); *C08L 2205/025* (2013.01); *C08L 2205/035* (2013.01); *C09D 103/02* (2013.01)

(58) Field of Classification Search
None
See application file for complete search history.

(56) References Cited

U.S. PATENT DOCUMENTS

| | | | |
|---|---|---|---|
| 3,468,414 A | 9/1969 | Harris | |
| 4,202,804 A | 5/1980 | Porzel et al. | |
| 4,992,481 A | 2/1991 | von Bonin et al. | |
| 5,194,087 A | 3/1993 | Berg | |
| 2003/0087995 A1* | 5/2003 | Huhn | ............ C09K 21/00 524/13 |
| 2005/0056187 A1 | 3/2005 | Podlas | |
| 2005/0222302 A1 | 10/2005 | Pageau | |
| 2013/0245155 A1* | 9/2013 | Van Loon | ............ C09K 3/10 523/122 |

FOREIGN PATENT DOCUMENTS

| | | |
|---|---|---|
| DE | 4331141 A1 | 3/1995 |
| DE | 202008003235 U1 | 6/2008 |
| EP | 1347107 A1 | 9/2003 |
| EP | 1616906 A1 | 7/2005 |
| GB | 696965 | 9/1953 |
| GB | 1356382 | 6/1974 |
| GB | 1524091 | 9/1978 |
| GB | 2155944 A | 10/1985 |
| WO | 2011015714 A1 | 2/2011 |

OTHER PUBLICATIONS

Second Technical Examination of Patent, dated Mar. 21, 2016, 4 pages.
European Search Report dated Jul. 11, 2018 in corresponding PCT international patent application No. DK2015050415.

* cited by examiner

*Primary Examiner* — Robert T Butcher
(74) *Attorney, Agent, or Firm* — Gearhart Law LLC

(57) ABSTRACT

A composite caulk comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein said composite caulk forms a heterogeneous caulk which can be dispensed using a handheld caulking gun.

12 Claims, No Drawings

CAULKS

This application is a national application of PCT-application PCT/DK2015/050415 filed on Dec. 23, 2015, which claims priority of Danish patent application No. PA201400749 filed on 23 Dec. 2014, both of which disclosures are incorporated herein by reference.

FIELD

The present invention relates to caulks for caulking e.g. windows and other building objects installed into the outer walls of buildings, wherein it is desirable to create a water resistant seal between building object and wall, which is at the same time easy to apply, water resistant yet does not discolor due to fungicidal growth.

BACKGROUND

It is a persistent problem in building construction that materials and construction elements of a variety of constituent materials must be joined together to form the building. Windows of glass must be fitted into frames of metal, wood or plastics, window frames must be fitted into the sustaining walls, which are typically made from concrete or bricks; and the walls must be secured to the buildings foundation in order for the building to remain standing. In particular in modern buildings, construction elements very often arrive prefabricated at the building site and are inserted into the building's frame work with minimal or no adaptation of the prefabricated construction element.

In many cases, such as a window frame being fitted into a brick or a concrete construction, the construction element arrives prefabricated with a dimension which is smaller by a significant margin (often dictated by governmental standards), leaving a gap between the prefabricated construction element and the building proper. While this is advantageous as it eases the insertion of the prefabricated construction element into the building and minimizes any subsequent adaptation, the joints between the element and the building proper must necessarily be closed prior to human use of the finished building.

The process of closing such joints between building elements is known as caulking and the materials used are considered caulks. The function of caulking is to provide thermal insulation, and control of water penetration and of noise mitigation.

Historically, caulks were either mortar or plasto-elastic materials such as e.g. pitch. Today a variety of caulks are known. In particular plasto-elastic materials, known as sealants, are ubiquitously used in the building industry. In this respect, plasto-elastic materials have the advantage over mortar that they are easy to apply, normally using a handheld caulking gun, and will retain a fluid-tight joint seal over many years all the while permitting the different construction materials the freedom to become displaced relative to each other with the varying weather conditions experienced by the building during the lifetime of the sealant.

Numerous construction chemicals are sold as caulk such as e.g. silicone, and acrylic sealants. Unlike construction caulk, which is applied where no building movement is expected, a sealant is made of elastomeric materials that typically allow movement of 25% to 50% of the width of the joint. Silicone sealants form a durable, water-tight seal, but are not typically paintable. Some silicone sealants are made to be paintable with certain types of paint such as water or oil-based paints. Other sealants are paintable.

Sealants are commonly sold in cartridges which are loaded into a pistol-like caulking gun (opening at the side) or barrel gun (opening at the end) for application. During the tool-working time, which varies by chemistry, the caulk can be pressed into the joint so that it can bond with the materials on both sides, and also be smoothed. The time it takes for a chemical sealant to become a sealing rubber is known as the curing time and varies by temperature and humidity. It is an advantage of modern sealants that they bond well to the various surfaces encountered in modern building construction materials.

A problem of modern plasto-elastic sealant materials when used as caulks compared to mortar is leakage of plasticizers over time. This reduces the strength of the seal and can lead to costly and time consuming re-caulking of the joint. Another problem compared to mortar of modern plasto-elastic sealant materials when used as caulks is the low diffusivity of the sealant material for water.

In a building, water is ubiquitously present both indoors as well as outdoors. Trapping water inside a building will lead to significant problems with mold growth and an associated and very significant health risk to the individuals living inside the building. Permitting the water to leave the building by venting the building or by actively removing moisture using air condition systems is therefore necessary. However, at cold spots or next to water impermeable surfaces, water will accumulate and molding may occur.

This problem is particularly persistent where modern sealants are applied as caulks as these are not diffusion open to water. Such sealants are therefore often attacked by molds leading to unaesthetically looking joints and potentially posing health risks. Further, the vapor barrier created by the water tight seal will be at the wrong (indoor) side of the building. This may cause wooden window frames or wallpaper next to the joint to mold, which can be costly in repairs and poses a potential health risk. Hence it is an object of the present invention to suggest improved caulks which at least partially will overcome the problem of molding of the joint during the joint's life time.

Another aesthetic problem of modern sealants compared to mortar is related to the color of the seal. Modern sealants generally do not have an aesthetically pleasing color compared to a building's surface, often differing significantly from the colors of the other building materials. It is therefore another aspect of the present invention to suggest improved caulks which at least partially will overcome this problem and wherein the improved caulks of the invention have a color and an appearance traditionally associated with mortar, yet retaining the ease of applicability and good adhesive properties associated with modern sealants.

A further problem of modern sealants is their relative high cost per volume. This repeatedly creates the need for filling the intermediate volume between the building objects with cheaper filling material, typically an insulating material, prior to application of the sealant. This adds an additional handling step in the construction process, requiring additional man power and man time, which is an unnecessary added cost. Accordingly, there is further the need for a caulk which is insulating yet less expensive compared to modern sealants.

To these purposes the present inventors suggest the use of a composite caulk comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun.

In the art, U.S. Pat. No. 3,468,414, it is known to make instant paper mache which comprises perlite as a mechanical binder or filler for enhancing the porosity of the paper mache following its ultimate usage and drying. The compositions of U.S. Pat. No. 3,468,414 contains in percentage by weight: Paper (80% newspaper, 20% magazine) 45.7-47.2%, art or molding plaster 16.6-17.2%, perlite 9.7-17.1%, borated dextrin 5.6-7.9%, salt 4.3-6.6%, starch 4.3-11.1%, and carboxy methyl cellulose 4.2-5.7%; and were found suitable for making simple preformed building elements, such as e.g. bricks. However, the prior art is silent on the composite caulks of the present art as well as their intended use.

SUMMARY OF THE INVENTION

In a first aspect and embodiment of the present invention there is disclosed a composite caulk comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun.

In a second embodiment of the first aspect there is disclosed a composite caulk further comprising an aqueous modified starch dispersion adhesive or an aqueous modified starch dispersion adhesive reinforced with an aqueous acrylic dispersion.

In a third embodiment of the first aspect there is disclosed a composite caulk according to either the first aspect or the second embodiment wherein the fire retardant bark material is cork.

In a fourth embodiment of the first aspect there is disclosed a composite caulk according to any of the abovementioned embodiments wherein the polyvinyl-acetate based aqueous dispersion adhesive is a water resistant adhesive in class D3 of DIN EN 204.

In a fifth embodiment of the first aspect there is disclosed a composite caulk according to any of the abovementioned embodiments comprising on a weight/total weight basis:
Paper wool: 3-10%;
Perlite: 10-20%;
Particulated Wood: 15-25%;
Particulated Bark: 10-35%;
The balance adhesive.

In a sixth embodiment of the first aspect there is disclosed a composite caulk according to any of the abovementioned embodiments comprising on a weight/total weight basis:
Paper wool: 4-7%;
Perlite: 11-16%;
Particulated Wood: 17-23%;
Particulated Bark: 13-29%;
The balance adhesive.

In a seventh embodiment of the first aspect there is disclosed a composite caulk according to any of the abovementioned embodiments comprising on a weight/total weight basis:
Paper wool: 5%;
Perlite: 13%;
Particulated Wood: 20%;
Particulated Cork: 15%;
The balance adhesive.

In an eighth embodiment of the first aspect there is disclosed a composite caulk according to any of the abovementioned embodiments comprising on a weight/total weight basis:
Paper wool: 5%;
Perlite: 13%;
Particulated Wood: 20%;
Particulated Cork: 27%;
The balance adhesive.

In a ninth embodiment of the first aspect there is disclosed a composite caulk according any of the above embodiments; wherein the aqueous modified starch dispersion adhesive or the aqueous modified starch dispersion adhesive reinforced with an aqueous acrylic dispersion constitutes up to 10% of the total mass of adhesive.

In an tenth embodiment of the first aspect there is disclosed a composite caulk according to any of the abovementioned embodiments further comprising at least one fungicide in an amount biologically efficient to retard or hinder growth of fungus in the composite caulk.

In a second aspect of the present invention there is disclosed a method of preparing a composite caulk comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun; wherein paper wool, perlite, particulated wood and particulated bark are dry mixed prior to mixing with the adhesive(s); wherein when present the at least one fungicide is mixed into the composite caulk with or after addition of the adhesive(s); wherein when present the aqueous modified starch dispersion adhesive or the aqueous modified starch dispersion adhesive reinforced with an aqueous acrylic dispersion is added after the polyvinyl-acetate based aqueous dispersion adhesive and wherein the adhesive or adhesives is/are added in an amount sufficient to obtain a heterogeneous caulk which can be dispensed using a handheld caulking gun.

In a third aspect there is disclosed the use of a composite caulk according to any of embodiments of the first aspect for caulking a joint or a gap between separate building objects in a building.

DETAILED DESCRIPTION

According to the present invention, there is suggested novel caulks comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun; and the use such caulks for caulking joints between building objects during building construction or during building maintenance.

Paper wool, or as it is also known cellulose insulation, consists of about 85% cellulosic materials, typically recycled newspaper, and about 15% of fire retardant minerals such as e.g. boric acid, ammonium sulfate or aluminum hydroxide. In the experimental compositions of the present invention the paper wool consisted of 87.5% recycled newspaper, 8.7% aluminum hydroxide, 0.9% borax and 2.9% boric acid. While paper wool having a composition as described above is preferably used in the composite caulks of the invention, the exact composition of the comprised paper wool is not considered limiting on the invention.

The use of paper wool in the composite caulks of the present invention serves several purposes. Paper wool enhances the caulk matrix, is fire retarding as well as insulating and further provides a color palette which allows the composite caulks of the present invention to approach that of mortar.

Paper wool is present in the composite caulks of the present invention in an amount based on weight/total weight of between 3 to 10%, more preferably between 4 to 7%, and most preferably around 5%.

Perlite is used for enhancing the porosity of the caulk as is known in the art as well as for structural stability of the hardened caulk. In addition thereto, the addition of a mineral component enhances the visual aspect and the desired visual mortar-like appearance of the enhanced caulks.

Perlite is present in the composite caulks of the present invention in an amount based on weight/total weight of between 10 to 20%, more preferably between 11 to 16%, and most preferably around 14%.

Wood is a porous and fibrous structural tissue found in the stems and roots of trees and other woody plants. It has been used for thousands of years for both fuel and as a construction material. It is an organic material, a natural composite of cellulose fibers (which are strong in tension) embedded in a matrix of lignin which resists compression. In the context of the present disclosure, wood (while sometimes defined as only the secondary xylem in the stems of trees) is defined more broadly to include the same type of tissue elsewhere such as in the roots of trees or shrubs. The present invention utilizes wood as a composite filler to add tensional strength and resilience against compression.

In the context of the present disclosure there is used particulated wood having a particle size below 2 mm. One way of obtaining such particulated wood material could be by using sawdust, which is a cheap and abundant surplus material from the wood and carpentry industries. The skilled person will understand that some fraction of the particulated wood material can be larger than 2 mm without influencing the quality and flow properties of both the fresh as well as the hardened caulk. However, in order to achieve a suitable heterogeneous caulk which can be dispensed using a hand-held caulking gun, it is important that the fraction of oversized particles is kept to a minimum.

Particles smaller than 1 mm influence the caulk very little, however it is preferable that the majority of wood particles have sizes in the range of 1 mm to 2 mm in order to maximize the influence of the particulated wood on the structural properties of the hardened caulk. A preferred range as measured by sieving shall have at least 80%, preferably 90%, of all wood particles in the range from 1 to 2 mm.

No particular limitation is placed on the source of wood used in the present invention. Likewise, two or more sources of wood may be present in the composite caulks of the invention without influencing the final product. It has been found that in order to optimize the composite caulk, wood from so-called softwood (such as elder wood) is less preferable, while wood from so-called medium hardness wood (such as pinewood, birch, beech) or hardwood (such as oak, teak) are more suitable. Particulated wood which is naturally fire retardant is preferred.

Particulated wood is present in the composite caulks of the present invention in an amount based on weight/total weight of between 15 to 25%, more preferably between 17 to 23%, and most preferably around 20%.

Bark is the outermost layers of stems and roots of woody plants. Plants with bark include trees, woody vines, and shrubs. Bark refers to all the tissues outside of the vascular cambium and is a nontechnical term. It overlays the wood and consists of the inner bark and the outer bark. The inner bark, which in older stems is living tissue, includes the innermost area of the periderm. The outer bark in older stems includes the dead tissue on the surface of the stems, along with parts of the innermost periderm and all the tissues on the outer side of the periderm. The outer bark on trees is also called the rhytidome.

In the context of the present disclosure there is used a particulated fire retardant bark material having at least one axis of length with a dimension below 2 mm. One way of obtaining such particulated fire retardant bark material could be by using sawdust, which is a cheap and abundant surplus material from the wood and carpentry industries. The skilled person will understand that some fraction of the particulated fire retardant bark material can be larger than 2 mm without influencing the quality and flow properties of both the fresh as well as the hardened caulk. However, in order to achieve a suitable heterogeneous caulk which can be dispensed using a hand held caulking gun, it is important that the fraction of oversized particles is kept to a minimum.

Particles smaller than 1 mm influence the caulk very little, however it is preferable that the majority of particulated fire retardant bark particles have sizes in the range of 1 mm to 2 mm in order to maximize the influence of the particulated fire retardant bark on the structural properties of the hardened caulk. A preferred range as measured by sieving shall have at least 80%, preferably at least 90%, of all wood particles in the range from 1 to 2 mm.

One very suitable bark material in relation to the present invention is cork. Cork is an impermeable, buoyant material, a prime-subset of bark tissue that is harvested for commercial use primarily from *Quercus suber* (the Cork Oak), which is endemic to southwest Europe and northwest Africa. Cork is composed of suberin, a hydrophobic substance, and because of its impermeable, buoyant, elastic, and fire retardant properties, it is used in a variety of products, the most common of which is for wine stoppers. However, other sources of fire retardant bark exit and are equally suitable for use in the context of the present invention. Nevertheless, cork is preferred.

Particulated fire retardant bark is present in the composite caulks of the present invention in an amount based on weight/total weight of between 10 to 35%, preferably 10 to 30%, more preferably between 13 to 29%, and most preferably around 21%.

The composite caulk comprising paper wool, perlite, a particulated wood material having a particle size below 2 mm, a particulated fire retardant bark material having at least one axis of length with a dimension below 2 mm further comprises a polyvinyl-acetate based aqueous dispersion adhesive.

The aqueous dispersion adhesive constitutes the matrix of the composite caulk and hence constitutes the sealing material of the caulk. Aqueous polyvinyl-acetate dispersions are known to form good adhesives for porous stone, e.g. such as bricks or concrete, and further advantageous in the improved caulks of the present invention as cross-linking and curing of the adhesive is enhanced by the presence of boric acid in the paper wool. The aqueous dispersions suitable for the present invention have a dry matter content of from 40 to 50% by weight of the dispersion, most preferably between 44 to 46% dry matter.

It is preferable, that the polyvinyl-acetate based aqueous dispersion adhesives suitable for the present invention have a water resistance durability class below D2 according to DIN EN 204 as in place at the filing date of the present application (2014). Preferably, the durability class of the adhesive is not below D3 according to DIN EN 204, and most preferably, the adhesive is classifiable as a D3 adhesive according to DIN EN 204. A suitable example of a commercially available adhesive is ProFect® 2343 from PKI Industrilim of Fredericia, Denmark.

It is further advantageous, but not required, to modify and adjust the flow properties of the composite caulk using aqueous modified starch dispersion adhesives or aqueous modified starch dispersion adhesives reinforced with an aqueous acrylic dispersion. Such adhesives are well known as wall paper adhesives and form a good connecting matrix between the paper, wood, and bark components of the composite caulk and the inorganic components of both the composite caulk of the invention as well as the building objects where-between the caulk is applied.

If present, the aqueous modified starch dispersion adhesives or aqueous modified starch dispersion adhesives reinforced with an aqueous acrylic dispersion are present in an amount up to 10% of the total mass of adhesive, preferably up to 5% of the total mass of the adhesive. Suitable aqueous modified starch dispersion adhesives or aqueous modified starch dispersion adhesives reinforced with an aqueous acrylic dispersion in general have between 15 and 25% by weight of the aqueous modified starch dispersion adhesive dry matter, most preferably about 20% by weight of dry matter. A suitable example of a commercially available adhesive is DANA LIM vädrumslim 216 from Dana Lim of Køge, Denmark.

Adhesive is present in balancing amounts sufficient to reach 100% by weight when the weight percentage sum of the dry matter components is compiled.

While in general cured polyvinyl-acrylates have a good resistance to fungi, it can in circumstances be advantageous to further include at least one fungicide in an amount biologically efficient to retard or hinder growth of fungus in the composite caulks of the invention. Such fungicides are preferentially added to the adhesives prior to mixing with the dry matter components in the composite caulks of the invention. Suitably, commercially available adhesives comprising premixed adhesive and fungicide can be used for ease of manufacturing.

It is further required that the composite caulk forms a heterogeneous caulk which can be dispensed using a handheld caulking gun.

Handheld caulking guns are well-known in the art. They permit a person so desiring to dispense a viscous liquid, composition or complex fluid from a container, wherein the viscous liquid is contained, and onto a surface. The container usually has a moveable bottom and usually an oppositely positioned opening in the container. During use the caulking gun exerts a pressure through a piston action on the moveable bottom of the container, which causes a displacement of the bottom and of the viscous liquid in the container, causing the viscous liquid to leave the container as long as the piston action is maintained on the bottom.

Such caulking guns are used on viscous liquids of a broad viscosity range. Usually, the viscosity of the liquid is determined by the liquid's intended use and is not limited by the construction of the caulking guns. In the context of the present invention, the requirement that the composite caulk of the invention shall form a heterogeneous caulk which can be dispensed using a handheld caulking gun shall therefore be understood broadly as being a composite caulk which requires the use of a handheld caulking gun for dispensing, and therefore that the handheld caulking gun must be compressible by a person of normal strength, yet not being so liquid that upon application into a joint or gap in a building, the composite caulk of the invention will lack the necessary viscosity to remain in place in the joint during hardening, i.e. cease being a caulk.

According to the invention there is further disclosed a method of preparing a composite caulk comprising paper wool, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun; wherein paper wool, perlite, particulated wood and particulated bark are dry mixed prior to mixing with the adhesive(s); wherein when present the at least one fungicide is mixed into the composite caulk with or after addition of the adhesive(s); wherein when present the aqueous modified starch dispersion adhesive or the aqueous modified starch dispersion adhesive reinforced with an aqueous acrylic dispersion is added after the polyvinyl-acetate based aqueous dispersion adhesive and wherein the adhesive or adhesives is/are added in an amount sufficient to obtain a heterogeneous caulk which can be dispensed using a handheld caulking gun.

Further, there is disclosed the use of a composite caulk according to any of the embodiments of the invention for caulking a joint or a gap between separate building objects in a building.

EXAMPLES

Below are given several examples which will allow the skilled person to manufacture composite caulks according to the invention. The skilled person will understand that the composite caulks of the present invention comprise a significant portion of an aqueous phase from the adhesive. During curing and hardening of the applied caulk, this water evaporates and the final, hardened caulk will therefore have a weight distribution different from the composite caulks described in the below examples.

Example 1

A composite caulk according to the present invention comprising on a weight/total weight basis:
Paper wool: 3-10%;
Perlite: 10-20%;
Particulated Wood: 15-25%;
Particulated Bark: 10-35%;
The balance adhesive.

Example 2

A composite caulk according to the present invention comprising on a weight/total weight basis:
Paper wool: 3-10%;
Perlite: 10-20%;
Particulated Wood: 15-25%;
Particulated Bark: 10-20%;
The balance adhesive.

Example 3

A composite caulk according to the present invention comprising on a weight/total weight basis:

Paper wool: 4-7%;
Perlite: 11-16%;
Particulated Wood: 17-23%;
Particulated Bark: 13-18%;
The balance adhesive.

Example 4

A composite caulk according to the present invention comprising on a weight/total weight basis:
Paper wool: 3-10%;
Perlite: 10-20%;
Particulated Wood: 15-25%;
Particulated Bark: 24-30%;
The balance adhesive.

Example 5

A composite caulk according to the present invention comprising on a weight/total weight basis:
Paper wool: 5%;
Perlite: 13%;
Particulated Wood: 20%;
Particulated Cork: 15%;
The balance adhesive.

Example 6

A composite caulk according to the present invention comprising on a weight/total weight basis:
Paper wool: 5%;
Perlite: 13%;
Particulated Wood: 20%;
Particulated Cork: 27%;
The balance adhesive.

Example 7

The composition of any of the above examples comprising an aqueous modified starch dispersion adhesives or aqueous modified starch dispersion adhesives reinforced with an aqueous acrylic dispersion in an amount of 10% of the total mass of adhesive.

Example 8

The composition of any of the above examples comprising an aqueous modified starch dispersion adhesives or aqueous modified starch dispersion adhesives reinforced with an aqueous acrylic dispersion in an amount of 5% of the total mass of adhesive.

Tests

The composite caulks of examples 5 and 6 were prepared according to the above described method by dry mixing the solids and adding the polyvinyl-acetate based aqueous dispersion adhesive (ProFect® 2343 from PKI Industrilim of Fredericia, Denmark) in an amount to reach 100%, the test also including adding 10% of an aqueous modified starch dispersion adhesive (DANA LIM vädrumslim 216 from Dana Lim of Køge, Denmark) to the polyvinyl-acetate based aqueous dispersion adhesive.

Test 1: Standard Test for Strength of Caulked Joints

The tests for the strength of the caulked joints using the two above compositions were performed according to DS/EN 196-1: 2005: Methods for testing cement. This testing standard was chosen, although the caulks of the invention are not cements in the sense of the standard, as it is the regularly testing standard for cement caulks used for jointing and therefore, in the absence of a standard test for joint strengths for caulks of the present invention, was considered most appropriate in the present context.

Six prisms of size 160×40×40 mm$^3$ were formed and dried in a climate bench at 20° C. and 65% RH, each prism of composite caulk according to examples 5 and 6 prepared in triplicate. The resulting compressive strengths varied between 5.8 and 6.6 MPa and the resulting flexural strengths varied between 2.0 and 2.4 MPa, cf. Table 1 and Table 2.

TABLE 1

| Example 5 | Density (kg/m$^3$) | $f_{flex}$ | $f_{c1}$ (MPa) | $f_{c2}$ (MPa) | $f_{cm}$ (MPa) |
|---|---|---|---|---|---|
| 1 | 609 | 2.1 | 6.8 | 6.4 | 6.6 |
| 2 | 596 | 2.0 | 6.2 | 6.1 | 6.2 |
| 3 | 614 | 2.1 | 5.9 | 5.8 | 5.8 |
| Average | 606 | 2.0 | | | 6.2 |
| Standard Deviation | 8 | 0.1 | | | 0.4 |

TABLE 2

| Example 6 | Density (kg/m$^3$) | $f_{flex}$ | $f_{c1}$ (MPa) | $f_{c2}$ (MPa) | $f_{cm}$ (MPa) |
|---|---|---|---|---|---|
| 4 | 620 | 2.0 | 6.0 | 5.9 | 6.0 |
| 5 | 617 | 2.3 | 6.4 | 5.8 | 6.0 |
| 6 | 606 | 2.4 | 6.4 | 6.6 | 6.5 |
| Average | 614 | 2.2 | | | 6.2 |
| Standard Deviation | 6 | 0.2 | | | 0.3 |

Test 2: Strength of Caulked Joints Between Bricks

In a separate test, the caulks of examples 5 and 6 were used to joint three sets of two bricks together; total of six samples; and stored in a climate chamber for 28 days at 20° C. at 65% RH.

The average static load to cause disjoining was measured at 30.2 kg/joint±4.1 kg/joint; which is comparable to the binding strength of cement.

Disjoining was primarily in the caulk (68%±7%) with less than 10% of all disjoining being in the adhesive contact zone between caulk and brick, thus indicating a strong adhesion between caulk and brick wherein the strength of the joint is primarily determined by the rupture strength of the caulk and not by the rupture strength of the bond between caulk and brick.

Test 3: Weather-Test

In an outdoors test a joint of 20 mm between two planks of 2000 mm was created and the caulks of examples 5 and 6 were applied to the joint respectively over a stretch of the length of the joint between the planks.

The planks with caulks were placed in an outdoors, open gateway, thereby simulating an installation of a window frame in a new build house. The assembly was subjected to the weather conditions as is (autumn in Denmark).

The experiment showed that a relatively homogeneous drying and hardening of the caulk took place over the observation period without the caulks retracting from contact with the surfaces of the planks.

Conclusions from Tests:

Based on the above test it can be concluded that the caulks as described herein are suitable for jointing wooden window frames to bricks as intended, since the caulks will neither disjoin from bricks nor wood within the rupture strength of the caulk itself.

Closing Comments

The term "comprising" as used in the claims does not exclude other elements or steps. The term "a" or "an" as used in the claims does not exclude a plurality. A single processor or other unit may fulfill the functions of several means recited in the claims.

Although the present invention has been described in detail for purpose of illustration, it is understood that such detail is solely for that purpose, and variations can be made therein by those skilled in the art without departing from the scope of the invention.

The invention claimed is:

1. A composite caulk comprising cellulose insulation, perlite, a particulated wood material having a particle size below 2 mm, a particulated fire retardant bark material having at least one axis of length with a dimension below 2 mm and a polyvinyl-acetate based aqueous dispersion adhesive; and wherein said composite caulk forms a heterogeneous caulk which can be dispensed using a handheld caulking gun.

2. The composite caulk according to claim 1 further comprising an aqueous modified starch dispersion adhesive or an aqueous modified starch dispersion adhesive reinforced with an aqueous acrylic dispersion.

3. A composite caulk according to claim 1 wherein the particulated fire retardant bark material is cork.

4. A composite caulk according to claim 1 wherein the polyvinyl-acetate based aqueous dispersion adhesive is a water resistant adhesive in class D3 of DIN EN 204.

5. A composite caulk according to claim 1 comprising on a weight/total weight basis:
   Cellulose insulation: 3-10%;
   Perlite: 10-20%;
   Particulated Wood: 15-25%;
   Particulated Bark: 10-35%;
   The balance adhesive.

6. A composite caulk according to claim 1 comprising on a weight/total weight basis:
   Cellulose insulation: 4-7%;
   Perlite: 11-16%;
   Particulated Wood: 17-23%;
   Particulated Bark: 13-29%;
   The balance adhesive.

7. A composite caulk according to claim 1 comprising on a weight/total weight basis:
   Cellulose insulation: 5%;
   Perlite: 13%;
   Particulated Wood: 20%;
   Particulated Cork: 15%;
   The balance adhesive.

8. A composite caulk according to claim 1 comprising on a weight/total weight basis:
   Cellulose insulation: 5%;
   Perlite: 13%;
   Particulated Wood: 20%;
   Particulated Cork: 27%;
   The balance adhesive.

9. A composite caulk according to claim 2, wherein said aqueous modified starch dispersion adhesive or said aqueous modified starch dispersion adhesive reinforced with an aqueous acrylic dispersion constitutes up to 10% of the total mass of adhesive.

10. A composite caulk according to claim 1; further comprising at least one fungicide in an amount biologically efficient to retard or hinder growth of fungus in said composite caulk.

11. A method of preparing a composite caulk comprising cellulose insulation, perlite, a particulated wood material having a particle size below 2 mm, a particulated fire retardant bark material having at least one axis of length with a dimension below 2 mm and a polyvinyl-acetate based aqueous dispersion adhesive; and wherein the composite caulk forms a heterogeneous caulk which can be dispensed using a handheld caulking gun; the method comprising dry mixing cellulose insulation, perlite, particulated wood and particulated bark are prior to mixing with said polyvinyl-acetate based aqueous dispersion adhesive; wherein optionally at least one fungicide is mixed into said composite caulk with or after addition of said polyvinyl-acetate based aqueous dispersion adhesive; wherein optionally, an aqueous modified starch dispersion adhesive and/or an aqueous modified starch dispersion adhesive reinforced with an aqueous acrylic dispersion is added after said polyvinyl-acetate based aqueous dispersion adhesive and wherein said polyvinyl-acetate based aqueous dispersion adhesive alone or with said optional aqueous modified starch adhesives is/are added in an amount sufficient to obtain a heterogeneous caulk which can be dispensed using a handheld caulking gun.

12. Use of a composite caulk according to claim 1 for caulking a joint or a gap between separate building objects in a building.

* * * * *